United States Patent [19]
Klingman

[11] Patent Number: 5,729,594
[45] Date of Patent: Mar. 17, 1998

[54] ON-LINE SECURED FINANCIAL TRANSACTION SYSTEM THROUGH ELECTRONIC MEDIA

[76] Inventor: Edwin E. Klingman, 3000 Hwy. 84, San Gregorio, Calif. 94074

[21] Appl. No.: 660,529

[22] Filed: Jun. 7, 1996

[51] Int. Cl.$^6$ .................................................. H04M 11/00
[52] U.S. Cl. ...................................... 379/93.12; 395/226
[58] Field of Search ..................... 379/93.12, 91.01, 379/91.02, 93.02, 93.03, 93.04, 93.07; 395/201, 216–218, 226, 227, 238

[56] References Cited

U.S. PATENT DOCUMENTS

| | | | |
|---|---|---|---|
| 5,262,860 | 11/1993 | Fitzpatrick et al. | 379/92 |
| 5,283,731 | 2/1994 | Lalonde et al. | 379/93.12 |
| 5,594,789 | 1/1997 | Seazholtz et al. | 379/93.12 |
| 5,615,110 | 3/1997 | Wong | 379/93.02 |

*Primary Examiner*—Wing F. Chan
*Attorney, Agent, or Firm*—Claude A.S. Hamrick

[57] ABSTRACT

A remote communication system for facilitating secure electronic purchases of goods in on-line, wherein a suitable local user input device in association with a data transmission system, couples the user input into a packet network system for communication to a remote receiver/decoder apparatus to TRY a potentially desired product. Upon selection of the desired product by the user, a telcom network link is used to communicate a telephone number associated with the desired product from the user to the remote receiver to allow the user to BUY the desired product. The telcom network used to link the user input device to the remote apparatus may also include a 900 number billing system for assessing and collecting fees for use of the system.

22 Claims, 12 Drawing Sheets

ON-LINE SECURED FINANCIAL TRANSACTION SYSTEM THROUGH ELECTRONIC MEDIA

BACKGROUND OF THE INVENTION

1. Field of the Invention

The present invention relates generally to electronic financial transaction communication systems and more particularly to a system providing on-line secure communications using means available on most telephone equipment either POTS (plain old telephone system) or ISDN (integrated services digital network) for performing electronic shopping on the Internet transmission media.

2. Description of the Prior Art

More recently, electronic cash transactions have gained desirability with a particular emphasis on conducting such transactions on the internet. The advent of electronic cash transactions has led to rapid popularity of electronic shopping. Electronic shopping on the Internet appears to be the wave of the future inevitably replacing much of today's paper catalog shopping and perhaps even in-person shopping. This recent trend lends itself particularly well to shopping for software type of products in particular, due to the user's opportunity to try a demonstration or sample of the software product prior to making its purchase.

The basic difficulty that exists with today's financial transactions on the Internet transmission media is security and privacy concerns resulting from the easily readable nature of electronic information being transferred on such media. As messages move across the Internet, they can easily pass through many numbers of computers, any one of which can be utilized to copy the messages. To address security concerns, current solutions generally employ encryption techniques. In fact, almost all cash transaction schemes depend on encryption for privacy and security enforcement, as will be discussed in greater detail shortly.

Among other reasons, encryption is generally used to (1) protect information such as credit card numbers, (2) establish identity of either the merchant or the buyer, (3) verify information, and (4) provide electronic signatures that are legally binding and not likely to be forged. To this end, both public key and private key encryption or decryption schemes are deployed. Private key schemes depend upon a single "shared secret" for encryption and decryption while public key schemes publish one key and maintain another key as confidential. However, the downfall in employing these schemes as stated in the April, 1996 issue of *Business Communication Review* (page 4) is the requirement for a unique key associated with each user which results in not merely hundreds rather literally millions of encryption keys.

Models for secured digital money transactions currently seem to fall into two basic categories, credit card sales and digital travelers checks. Both categories depend upon encryption for security. A useful text describing prior art is Digital Money by Dan Lynch and L. Lundquist published by John Wiley & Sons 1996 ISBN 0-471-14178-X. A brief summary of several digital money transaction schemes is also found in the May 1996 issue of *WebSmith Magazine* in an article entitled "Digital Cash." An example of a prior art digital money transaction is where the subscriber using "touchtone" or personal computer and modems (not through the Internet) sends S payment information to a company by the name of CheckFree who in turn uses the existing U.S. Federal Reserve or MasterCard RPS System to transfer funds electronically from the subscriber's checking account to the creditor, or in some cases, a check is forwarded through the U.S. Post Office. The transaction is ultimately recorded on bank statements or cancelled checks. CheckFree's subscription software on the PC keeps track of transactions and telephone subscribers receive a monthly statement.

Several prior art digital money transaction schemes in use today are listed and described as follows:

CyberCash

Because the current banking credit card system is unable to handle internet traffic, CyberCash acts as a gatekeeper linking the internet to bank networks (currently Wells Fargo Bank and First of Omaha Merchant Processing) as needed. CyberCash provides security based on encryption in linking the Internet to bank networks. Cybercash handles credit card, debit card and cash transactions and works with any web browser to download a free software module. The transaction is performed as follows.

The merchant first sends an electronic invoice to the buyer to which the buyer's credit card number is ultimately appended. Then, the invoice and the appended number thereto are encrypted and returned to the merchant. The merchant further appends his own confirmation number, encrypts this information again and sends it to CyberCash's server which reformats and encrypts per banking standards for transmission to the banking network. Debit transactions require the merchant to open a CyberCash account in advance thereby allowing the buyer to request funds to be transferred to that account in order to pay for the purchased merchandise. Where the merchant does not have a Cyber-Cash account, he must first download software from Cyber-Cash in order to be paid. Cash transactions use "pointers" to cash existing "in escrow" accounts and customer bank accounts. Payments occur when pointers enact electronic fund transactions between escrowed accounts.

DigiCash

The prior art cash transaction model DigiCash, works directly with the banks, resembling purchasing travelers checks. The user or buyer sends money to the bank through his/her credit or ATM card and the bank sends back Electronic cash (E-cash) to the user. E-cash is an encrypted e-mail message containing numbers that correspond to a specific amount of money. These numbers can then be sent to the merchant as payment. The merchant forwards these numbers to the bank who in turn credits the merchant's account. In this method, the bank keeps track of the numbers.

E-cash

E-cash is yet another prior art technique that is used in conjunction with the Mark Twain Bank to allow "authentication" of digital cash withdrawals from bank accounts. A software program enables storing the withdrawn digital cash on the PC's hard disk. This stored "cash" can then be transferred to a seller's machine. In this scheme, participants must set up a World Currency Access account provided by the Mark Twain Bank.

First Virtual Holdings

Electronic transactions using prior art techniques can be based on Electronic mail (E-mail). The customer opens an account and is given an Identification (I.D.) number which is sent to the merchant via E-mail. The merchant forwards the E-mail to First Virtual to verify the customer's I.D. number. First Virtual then sends an E-mail message to the customer to verify the transaction. First Virtual performs the most sensitive parts of the financial transaction off-line performing actual transfers over a private network using Electronic Data Systems (EDS) Corporation.

NetBill

NetBill is an alliance between Carnegie Mellon University and Visa designed to allow information (not hard goods) to be bought and sold through the Internet. Customers deposit money into a NetBill account which is drawn upon by NetBill when purchases are made.

NetCheck and NetCash

This scheme was developed by the University of Southern California allowing registered users to write electronic checks to other users. Electronic checks may then be sent via E-mail as payment for merchandise purchased through the internet. Similar to paper checks, these checks authorize the transfer of funds from the accounts on which the check is drawn, to the account in which the check is deposited. NetCheck is based on Kerberos private key cryptography instead of the public key cryptography.

NetCheck and NetCash payments are both accepted by Pay-Per-View (PPV) a worldwide web (WWW) protocol which allows "previews" of documents based on HTML and HTTP protocols. Upon "payment" (via an allowed scheme), the merchant's server receiving the payment then releases the full document to the customer's web browser.

Netscape Communication Corp.

This prior art method appears to be the most common electronic cash transaction technique used today. Netscape has formed an alliance with First Data, who is the number one processor of bank card transactions and has licensed public key encryption technology from RSA Data Securities, Inc., to develop an electronic credit card based scheme which only works with Netscape's web browser. Netscape sells a commerce server package that supports "secure" on-line purchase and data exchanges.

Some of the difficulties inherently existing in cash transactions over an open network such as this one, are evident in Netscape's "Secured Socket Layer" (SSL) (similar to WinSock Services). SSL sits between applications (such as FTP, HTTP, etc.) and the TCP/IP Transport layer and serves to provide secure identification and communications over a client/server link based on "digital certificate" technology provided by VeriSign (a spin-off of RSA Data Security). Digital certificates require a "third party guaranty" which must be obtained by users of SSL before transactions may occur. Consequently, a certificate of authority, such as a corporate security officer verifying the identity of a person is required.

VeriSign, currently the only provider of digital certificates, not only generates the certificate, but includes the user's name, their public key for encryption, and a digital signature attesting that VeriSign has performed the appropriate background check on the server owner or client's identity. For this reason, it would appear that this scheme is designed more for the hundreds or thousands of merchants, and it is rather difficult to implement such a scheme where there are millions of sellers.

NTT

Nippon Telephone and Telegraph (NTT) has announced an on-line transaction system which allows users to transfer money or place credit from a bank account to the user's "credit card" based on a private key which is used in conjunction with a public key.

Open Market

"Open market" schemes allow a merchant following simple computer commands to open a "store" on its Internet merchant server for a fee, in addition to monthly usage fees. Open market connects merchant servers to payment servers on which data is secured with personal I.D. numbers, passwords, data encryption, and a security code generated by a smart card (required for large transactions).

Visa/Master Card

Visa and Master Card are working together on Secured Electronic Transactions (SET) based on encryption technology from RSA and VeriSign. The Visa/Master Card SET scheme has attracted major players such as IBM, Microsoft, GTE, Netscape Communications, VeriSign and SAIC. SET is a multiparty protocol, securing communications among five parties in a payment card transaction where the card provider, the card holder, the card holder's financial institute, the merchant and the merchant's financial institution are parties involved in performing each transaction.

Logicom

Perhaps the most relevant prior art scheme is one employed by a company by the name of Logicom who calls its scheme WEB900 using a "900" number published on a web page to gain authorization for accessing some or all of the information at the web site. Logicom's web site can be accessed at http:/www.netleader.com/logicom/qc900.htm.

In Logicom's scheme WEB900, charges for accessing some or all of the web site is via the use of a 900 number as follows. First, the buyer accesses the web page of interest, and then the buyer receives a seven-digit system code from the accessed web page. From the web page, the buyer also receives a 900 telephone number provided by the merchant. The buyer then places a call to the retrieved 900 number using a common telephone and also enters the seven-digit system code through the telephone keypad. The buyer then listens for a redemption code and upon receiving the redemption code, turns back to the web page on the Internet and enters the redemption code into a validation form provided by the merchant on his/her web page. Upon successful verification of the redemption code, the buyer is now given access to the previously-locked web page. The buyer then downloads the desired information or purchased product to his/her local system (PC). The telephone company (telco) then bills the buyer (perhaps through the buyer's telephone bill), collects the money, and ultimately distributes the funds minus any service charges associated with the 900 call to the merchant.

While the Logicom system uses a 900 calling number, it does not differ from other prior art schemes in the sense that the switched network is used only to access the Internet. That is, the 900 line connection is effectively accessed off-line and represents a separate stage in the process. In this scheme, Telco is considered an auxiliary network, useful only for connecting to the Internet. The Logicom scheme never uses the 900 number to directly access the merchant's server. A further disadvantage of the Logicom system is that the 900 number voice call accomplishes the financial transaction only when used with redemption codes and authentication forms.

The following provide additional information regarding Digital Money schemes:

| | |
|---|---|
| Checkfree | http://www.checkfree.com |
| Cybercash | http://www.cybercash.com |
| Digicash | http://www.digicash.com |
| Ecash | http://www.marktwain.com |
| First Virtual Holdings | http://www.fv.com |
| MasterCard | http://www.mastercard.com |
| NetBill | Tel: (412) 268-2000 |
| NetCheque/NetCash | http://nii-server.isi.edu:80/info/NetCheque |
| Netscape Comm | http://mosaic/unicorn.com |
| Open Market, Inc. | http://www.openmarket.com |
| VeriSign | http://www.verisign.com |
| VISA | http://www.visa.com |

| | |
|---|---|
| Web900 | http://logicom.com |
| | http://delivery.reach.com |
| | www.twenty.com |
| "Electronic Commerce" | PC Magazine May 28, 1996, page 54–60. |

In summary, most of today's electronic funds transaction schemes are based on encryption employing either public keys or private keys and further-entailed distributing keys, for keeping track of lost keys and preventing forged and stolen keys. These and other problems associated with key management schemes are clearly difficult to resolve on a massive scale.

Additionally, most prior art schemes depend upon E-mail or internet communications via FTP, web browsers, etc. where encryption is required due to the public, postcard-like nature of Internet communications. Many prior art schemes have tried to address these problems by coupling to commercial banking networks to provide a degree of security, however most banking schemes require the users to open and maintain bank accounts and/or escrow accounts. Encryption-based schemes generally require a "digital certificate" to authenticate identification of parties to a transaction in order to address the problems of lost keys and flaws in the encryptic algorithm, stolen keys, etc. Finally, Logicom's scheme using the 900 number to directly access the merchant server, accomplishes financial transactions only when used with redemption codes and authentication forms.

A common difficulty among prior art on-line financial schemes arise from connecting the transaction parties to the existing banking network. In FIG. 1, we observe that Cyber-Cash exists as an interface layer connecting CyberSpace to Banking Space (Banking Net in FIG. 1). Layered architectures are of considerable importance. In 1979 the United Nations CCITT (now the ITU=International Telephony Union) International Standards Organization (ISO) began work on the Open Systems interconnection (OSI) architecture. The Seven Layer OSI standard model was published in 1984. (See Uyless Black: "OSI-A Model for Computer Communication Standards", Prentice Hall 1991, ISBN 0-13-637133-7). In the abstract, the Financial layer is the same as any layer in the abstract, such as the Physical layer, the Data Link layer, the Network layer, the Transport layer, the Session layer, the Presentation layer or the Application layer. Prior art schemes interface the Financial layer to the TCP/IP transport layer, thus forsaking real network addresses and physical space for virtual Internet Protocol (IP) addresses in CyberSpace. When the Financial layer interfaces to the Transport layer, financial transactions occur between two internet nodes (the client and the merchant server) whose IP addresses exist in CyberSpace. This is shown in FIG. 2 where the client 82 conducts financial transactions with the merchant server 84 through the Financial layer 80. Between the local client system and Physical layer 78, sequentially reside Application layer 70, Transport layer 72, Network layer 74 and Data Link layer 76. Financial layer 80 interfaces to Transport layer 72.

To further appreciate some of the drawback of prior art schemes for financial transactions, an understanding of network connectivity is necessary. There are primarily two types of networks in use today, switched and packet networks. Most voice communications (telephone lines, fax derivatives, etc.) use switch networks, while most Internet data communications, including packetized voice and video, employ packet routing networks. The switch network establishes a connected network by switching physical links until an end-to-end path exists from the caller to the called party. This obviously entails distance-base pricing for establishing the connected network.

A packet network (connectionless network) such as used in the Internet media, routes packets from node-to-node over local links until the destination is reached or the number of hops is exceeded. Each hop is almost free of cost. Therefore, the cost of packet communications is distance independent. The source and destination addresses are key to connectionless or packet communications. However, these addresses are not secure. The destination address can be changed and information re-routed or the source address can be changed for anonymity via re-mailers. Information cast into the packet network is, on the other hand, low cost, yet high risk.

It is key to note that connected lengths in switched networks, have physical source and destination addresses, and these physical addresses (especially wired local loops) provide a degree of security and, if desired, lack of anonymity that is valuable in a business sense.

The typical Internet communication is through the switched network to a packet router. All communications proceed through both the switch network and the packet routing Internet network. This is effective, but does not make full use of the distinct features associated with each type of network. Prior art schemes for conducting financial transactions employ multi-network schemes having both switch and packet routing. The switched network is primarily only a means for connecting to the internet. This limited use of the switched network completely discounts and ignores the advantages, i.e., the inherent privacy and security of a switched end-to-end connection, associated with switched network systems. The inherent privacy and security of a switched end-to-end connection between physical addresses is the goal of prior art schemes using encryption and digital signatures which are employed as an attempt to accomplish in CyberSpace the functions accomplished by the built-in financial mechanisms of the 800/900/XXX directory number systems.

Thus, encryption, digital signatures or other authentication procedures are required to establish credit between "ghost-like" buyers and sellers. Accordingly, the need exists for a on-line secure communication scheme for performing financial transactions while eliminating the need for digital signatures, encryption, and authentication procedures.

SUMMARY OF THE INVENTION

It is therefore a principal objective of the present invention to provide an on-line financial transaction system that uses state-of-the-art computer telcom to provide secure and private purchasing capability of product goods. Another objective of the present invention is to provide a system of the type described which uses the 900 number system or a similar system to assess and collect user tolls for use of the system in performing financial transactions.

It is yet another objective of the present invention to provide a system for performing financial transactions wherein inexpensive servers can be employed, eliminating the need for digital signatures, authentication procedures and banking system connectivity.

Still another objective of the present invention is to provide a financial transaction system wherein the accounting, billing and collecting funds may be managed by telco.

It is a further objective of the present invention to provide an on-line financial transaction scheme based upon a multi-network solution in which the distinction between switched and packet routing networks are used to optimally partition functionality.

It is another objective of the present invention to provide a system wherein small-shop software developers can market their products to the public inexpensively.

It is yet another objective of the present invention to provide a financial transaction system employing point-to-point protocol (PPP), thereby allowing any hardware or operating system to negotiate a common information transfer protocol with dissimilar hardware and operating systems software.

Briefly, a preferred embodiment of the present invention includes a remote communication system for facilitating secure electronic purchases of goods on-line, wherein a suitable local user input device in association with a data transmission system, couples the user input to a packet network system for communicating to a remote receiver/ decoder apparatus to TRY potentially desired products. Upon selection of the desired product by the user, a telcom network communication link for communicating a telephone number associated with the desired product from the user to the remote receiver allows the user to BUY the desired product. The telcom connection, linking the user input device to the remote server device may also include a 900 number billing system to support the BUY transaction.

These and other objects and advantages of the present invention will no doubt become apparent to those skilled in the art after having read the following detailed description of the preferred embodiments illustrated in the several figures of the drawing.

IN THE DRAWINGS

DETAILED DESCRIPTION OF THE PREFERRED EMBODIMENTS

Figure 1:
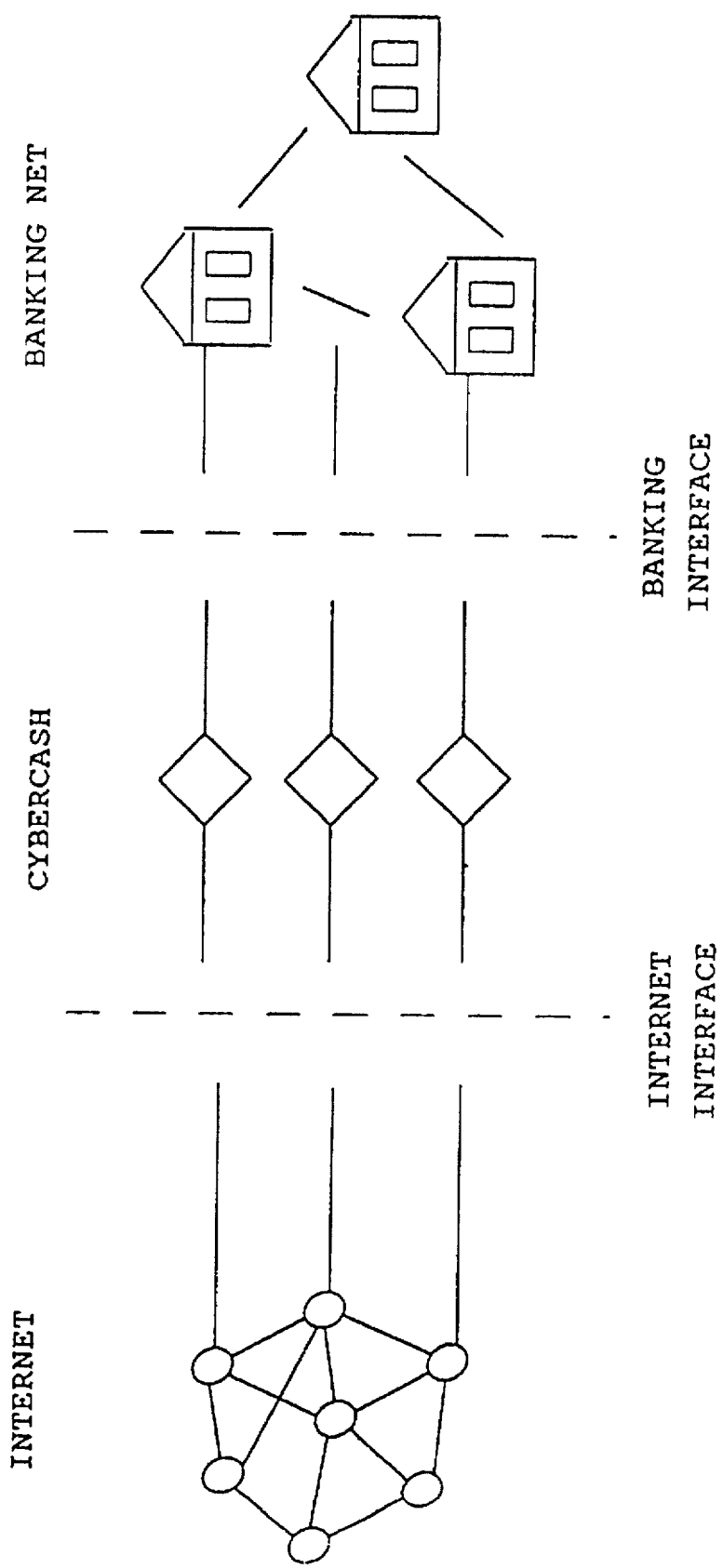
FIG. 1 depicts a prior art CyberCash financial scheme where the Internet is interfaced to the Banking Net.
Figure 2:
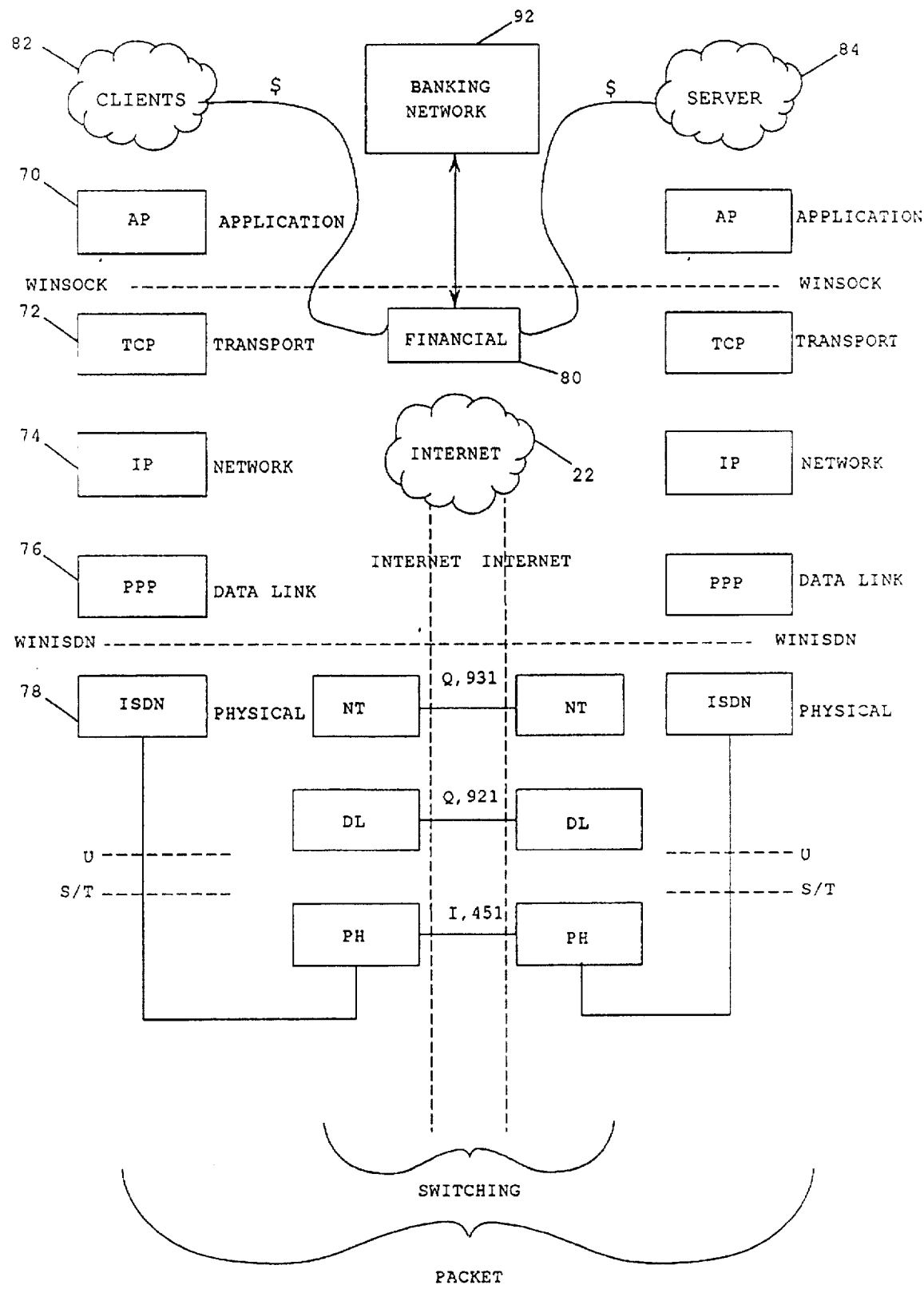
FIG. 2 depicts prior art on-line financial schemes interfacing the Financial layer to the Transport layer.
Figure 3:
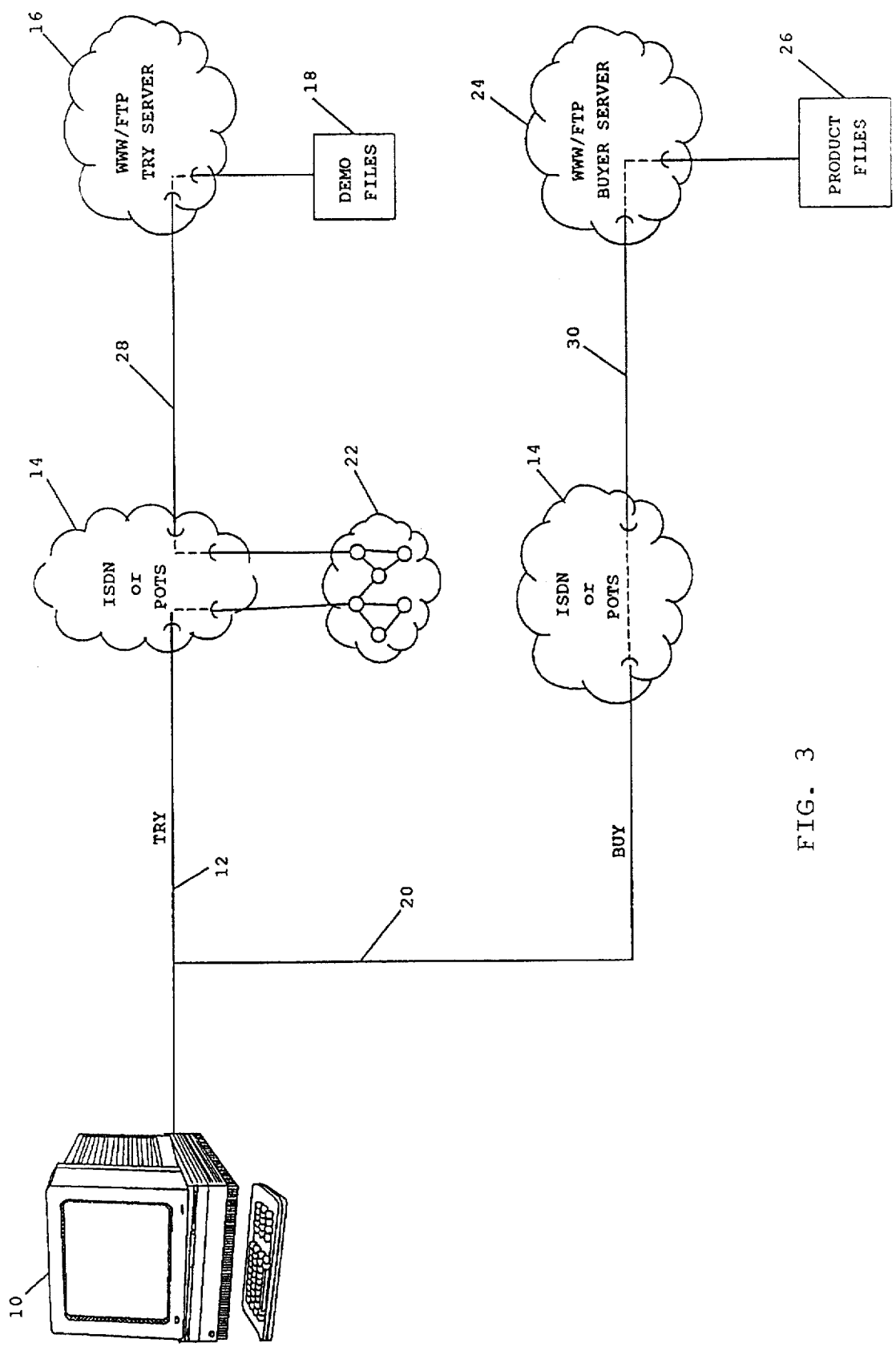
FIG. 3 shows a preferred embodiment of an overall diagram of the financial transaction system employed in the present invention.

Referring now to the drawing, FIG. 3 shows in conceptual diagrammatic form two channels, 'TRY' and 'BUY,' for establishing communications between a user and a remote system. As such, a user input device or subsystem 10 and a TRY local telcom connection 12 are connected through a switching system or network 14 and Internet transmission media 22 to a TRY remote telcom connection 28 which couples to a remotely located subsystem TRY server 16. TRY server 16 accesses files from demo file storage location 18 wherein demonstration files reside. User input subsystem 10 is additionally coupled through a BUY local telcom connection 20 to switching network 14 and a BUY remote telcom connection 30 to a remotely located subsystem BUY server 24 which accesses files from product file storage location 26 wherein electronic information such as software data are stored.

Figure 4:
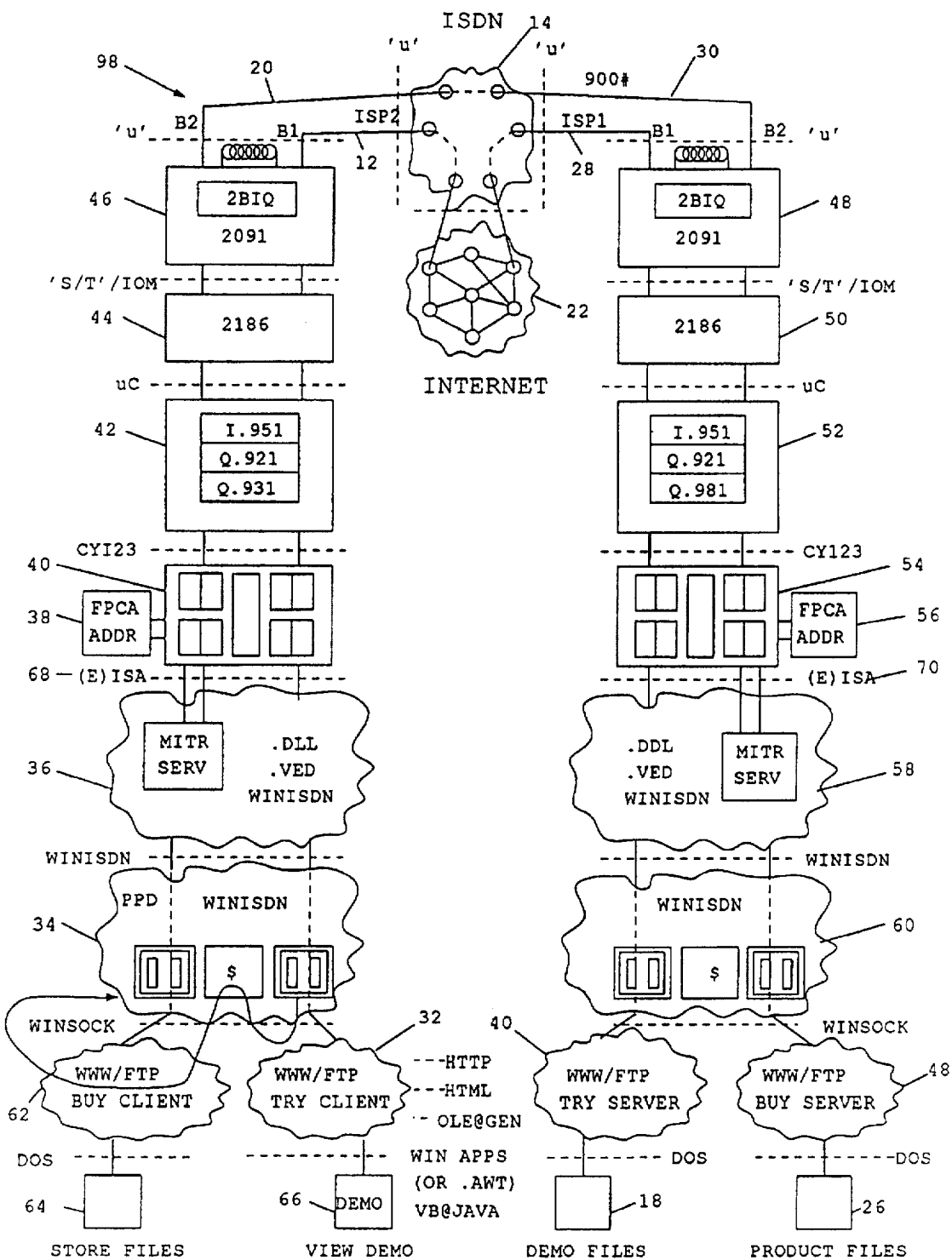
FIG. 4 shows a detailed diagram of the TRY and BUY financial transaction scheme employed in the preferred embodiment of the present invention.

FIG. 4 depicts a more detailed diagram of an embodiment of the present invention. The left side of the figure illustrates the connection layers on the client side, and the right side illustrates the connection layers of the server(s). The buyer or client operates the client side while the seller or merchant maintains the server(s). On the client side (left side of FIG. 4) typically a user subsystem would be a personal computer (PC) such as an IBM compatible PC including a monitor such as the client's display device 66 used for viewing demo products. The user's subsystem would further include web browsers 32 and 62 and TCP/IP protocol stack 34 which may be WinSock software and a plug-in card in the PC incorporating address decoder 38, dual port RAM 40, ISDN Protocol Controller 42, ISDN S/T interface device 44, and optionally Network Terminator 46. The card may be a CyberSpace Freedom Series ISDN terminal adaptor board for IBM PCs available from ISDN*tek Incorporated of San Gregorio, Calif. The user subsystem may include WinISDN drivers 36 available from ISDN*tek and WinSock software as TCP/IP protocol stack 34 from NetManage. A dual port RAM 40 addressed by address decoder 38 is accessed on one side by ISDN drivers 36 through the PC ISA or EISA bus (as the case may be) 68, and the other side by the Cybernetic Micro Systems CY123 ISDN Protocol Controller, 42, which decodes driver commands and issues ISDN Q.931 messages on the D-channel by managing appropriate buffers in the Siemens 2186 ISDN S/T interface device, 44. The S/T (4-wire) interface connects to the Network Terminator 46 of the (2-wire) local loop from the switch. This device, 46, can be a standard unit or can be implemented as on ISDN*teks CyberSpace cards with Siemens 2091 ISDN Adaptive Echo Cancelling 2B1Q encoder/decoder. Client encoder/decoder 46 transmits data through the 'U' interface to either or both the TRY local telcom connection 12 (B1) or the BUY local telcom connection 20 (B2), connections 12 and 20 may be implemented as ISDN lines or POTS lines.

The local switching system 14 need not be an ISDN switch. TRY local connection 12 is a WEB connection through the Internet transmission media 22 which consists of many routers and switches and is a packet routing network structure as described earlier. Internet media 22 connects TRY local connection 12 to the TRY remote telcom connection 28. BUY local connection 20 on the other hand, is a direct switch telco connection through switching system 14 to BUY remote telcom connection 30. From the TRY and BUY remote telcom connections 28 and 30, the seller's interfaces resemble the client's interfaces, i.e., TRY and BUY remote connections 28 and 30 connect to the seller ISDN 'S/T' interface device 50 through seller Network Terminator (NT1) device 48 which encodes and decodes the 2B1Q signals across the 2-wire 'U' interface. The 4-wire ISDN interface device 50 connects to seller ISDN protocol controller 52 which accesses seller dual port RAM 54 on one side and seller ISDN drivers 58 on the other side. Addresses provided by the ISDN driver 58 cross the (E) ISA bus 70 and are decoded by the address decoder 56 before accessing the dual port RAM 54. Seller terminal adaptor board (incorporating 48, 50, 52, 54, and 56) may be a PC plug-in board communicating through (E) ISA bus 70 with the ISDN driver 58. The drivers 58 are connected to a BUY server 24 and a TRY server 16 by the WinSock TCP/IP protocol stack 60. The latter accesses the seller's WEB page and/or demonstration software files from demo file storage location 18 which may be in the form of hard disk, CD ROM, etc. The BUY server 24 accesses software product files that are available for sale to the client from a product file storage location 26. BUY server 24 and TRY server 16 are physically in areas that are remotely located with respect to the user. Additionally, BUY server 24 and TRY server 16 may be located remotely from each other. An example of this is where a seller may want to have TRY server 16 located in the marketing area of the organization and the BUY server 24 located in the purchase area of the organization and the marketing and purchasing facilities are physically located in two separate buildings or geographic areas. In fact, the only relationship between the TRY server 16 and BUY server 24 is the product that is for sale. Practically, TRY server 16 may be accessed many more times than BUY server 24 due to the number of users wanting to browse the seller's web page or wanting to try the demo software. Obviously, TRY server 16 and BUY server 24 may alternatively reside in the same physical location.

Before describing the operation of the entire system of the preferred implementation, operation of key subsystems and interfaces are described as follows.

Interfaces in the Preferred Implementation

The Windows Interface: The "Windows" API is the Application Programming interface developed by Microsoft Corporation. It is well known to those skilled in the art, and is described in hundreds of books in the public domain.

The Winsock Interface: The "Winsock" Interface was developed by Netmanage Corporation and others, and is supplied by Netmanage, Spry/Compuserve, FTP Software, Frontier Technologies, Microsoft Corporation, and others. The Winsock description is in the public domain, and has been available over the Internet for free downloading at:

ftp.netmanage.com/pubs/win_standards/winsock.

The WinISDN Interface: The "WinISDN" Interface was developed by Netmanage and ISDN*tek, Inc., and Performance Systems International (PSI) and is supported by Netmanage, ISDN*tek, IBM, FTP Software, Shiva Corporation, Frontier Technology, Digi International, US Robotics, Yamaha, and other public corporations. WinISDN is in the public domain and has been available via the Internet for free downloading at:

ftp.netmanage.com/pubs/win_standards/winisdn/ winisdn.doc and is described in the Software Developers Kit (SDK) available from ISDN*tek.

The (E) ISA Interface: The (E) ISA bus was developed by IBM and is in the public domain. It is well described in numerous publications and texts in the public domain, and is well known to one skilled in the art. It is an electrical and mechanical specification for designing adapter boards for interface to IBM PCs and clone computers.

The "S/T" or "U" Interface: The "S/T" interface is specified by the CCITT/ITU recommendations, and is available worldwide as the primary interface to ISDN networks for Basic Rate Interface circuits. These recommendations are in the public domain. In addition, the 2B1Q-based "U"-interface is available in North America, and is also well known to one skilled in the art.

The TCP/IP Interface: The TCP/IP protocol is the primary interface to the Internet routers and is in the public domain and is well known. The TCP/IP protocol stack is accessed via the WinSock interface in the preferred implementation of the present invention.

The financial/monetary (900#) interface: The only public domain financial interface available today is the 900 number system available from Recognized Private Operating Agencies (RPOAs) such as PacBell, Bell Atlantic, etc. Therefore, the preferred implementation uses the 900# financial interface. The 900 numbers are telephone toll numbers provided by the telephone company charges the user a toll fee every time the 900 number is dialed and a connection is established based upon the period of time associated with the user connect time.

System Operation

Figure 5:
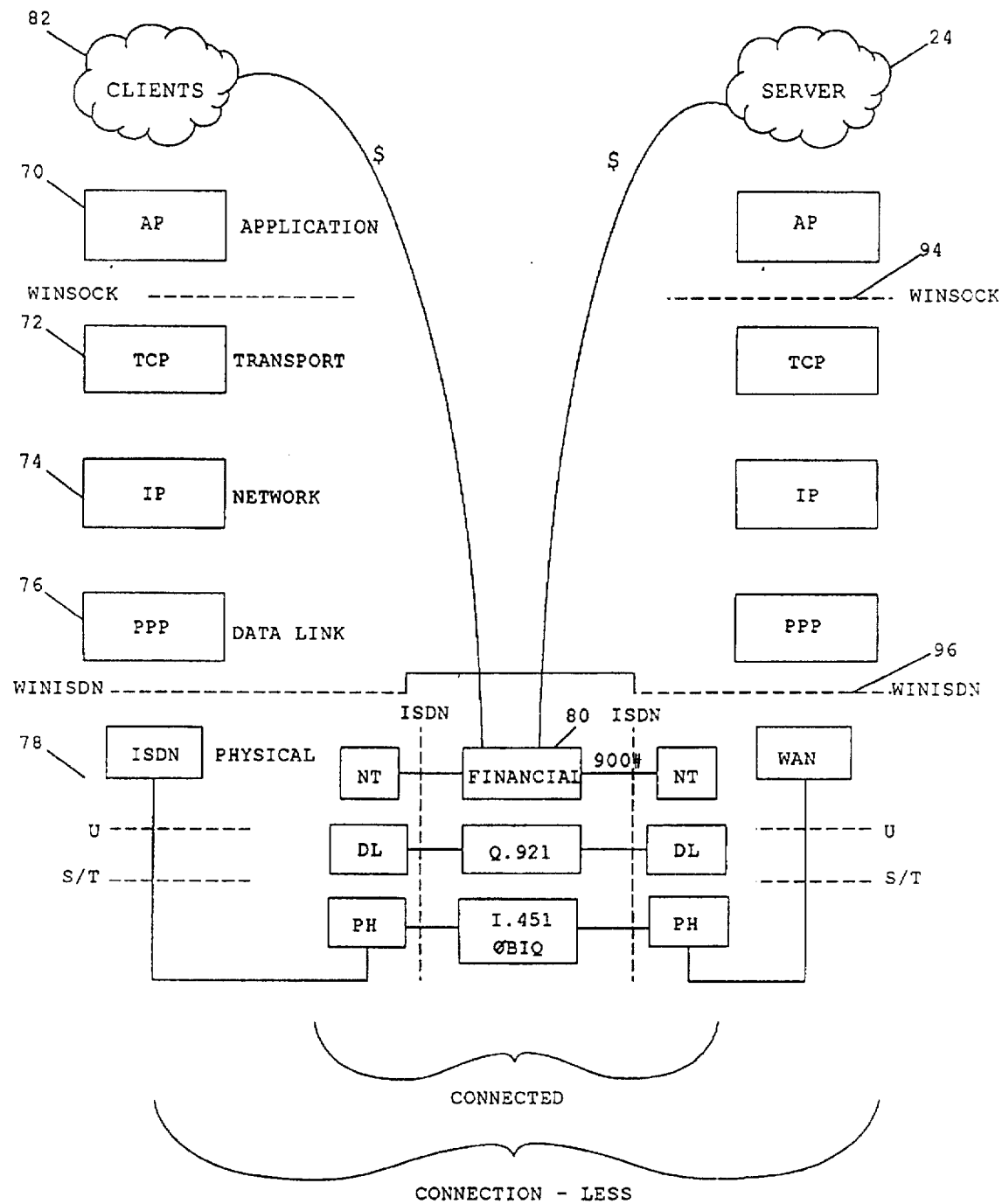
FIG. 5 shows interfaces of network layers as employed by the present invention.

In order to fully understand the advantages of the present invention an understanding of network layers is helpful. In FIG. 5, the client 82 directly interfaces to the Application layer 70. The Application layer 70 interfaces through WinSock to the Transport layer 72 and the Network layer 74. As discussed above, the TCP/IP protocol is the primary interface to the Internet routers. The Data-Link layer 76 resides below the Network Layer 74 and employs Point-to-Point Protocol (PPP) and its multi-point extensions, MP.BACP, etc.

BUY server 24 will be set by the seller to "listen" and "accept" incoming calls from the 900 number through WinSock and WinISDN interfaces 94 and 96, respectively. "Listen" and "accept" are instructions supported by WinSock [listen()] and WinISDN [ISDN listenforconnection()]. This places the BUY server 24 in a mode waiting for requests on the 900 number from the client. The client dials the 900 number using either a second ISDN channel (B2) or a POTS line. In using a POTS line, the client would simply hang up his first connection to the Internet and dial the 900 number that he retrieved with the product information from TRY server 16. At this time the client has a direct connection through the network rather than through the Internet, to the 900 number terminal. This path is 98 in FIG. 4 wherein B2 on BUY local telcom connection 20 is directly connected through interface "U" to BUY remote telcom connection 30 and thereafter to BUY server 24. In the case where the client is using ISDN lines, the first line such as B1, will be connected to the internet and may remain connected while the client makes a 900 call on the B2 ISDN line. On the seller's side (the right side of FIG. 4) when ISDN controller 52 detects the incoming 900 call it issues an "Incoming Setup" event notification to the (listening) ISDN driver 58 via an interrupt signal across the (E)ISA bus interface 70. The ISDN driver 58 commands the ISDN controller 52 (via the dual port RAM 54) to issue a Q.931 protocol "CONNECT" message to the ISDN switch 14, and the driver also issues an event notification (either a "callback" or a "windows message") to the (listening) WinSock protocol stack 60, informing WinSock that a channel is open. WinSock in turn, initiates the PPP negotiation with the calling client, and the connection is established.

Upon connection of the 900 direct line, the user is charged by telco a fee associated with connection of the 900 call. This fee may be assessed in a number of ways including directly associating the fee with the period of time during which the 900 call remains connected. If the client wishes to purchase non-software goods, the cost may also include the price of the merchandise. Therefore, the user receives in his regular telephone bill a statement of the merchandise price including any 900 telephone call service charges. Telco then collects this fee from the user and deducts its service charge costs and forwards the remaining amount to the merchant. In fact, telco may decide to disallow the user from using the 900 number due to the user's previous credit history. Furthermore, because the 900# access that generates the billing and communication through this telcom link is a direct connection, there is no need to perform any kind of authentication such as PAP (Password Authentication Protocol) or CHAP (Challenge Handshake Authentication Protocol) which are authentication protocols added for security purposes. Although authentication protocols are not necessary in the present invention, they may added to provide additional integrity to the system. For example, PAP may be employed to confirm two parameters from the demo/information product wherein one parameter may be the price of the product (this will be discussed in greater detail later).

Contention for Control

It must be assumed that "collisions" will occur when multiple clients attempt to call the same 900 number simultaneously. This is best resolved by using a telco "HUNT GROUP" whereby the telephone company hunts for a free line in a group of lines dedicated to serving the incoming 900 calls. in those cases where the system is overloaded, the ISDN switch will generate "BUSY" signals, either POTs Tones or ISDN Q.931 messages. In this case the client will have to redial.

Description of an ISDN Implementation

Figure 6:
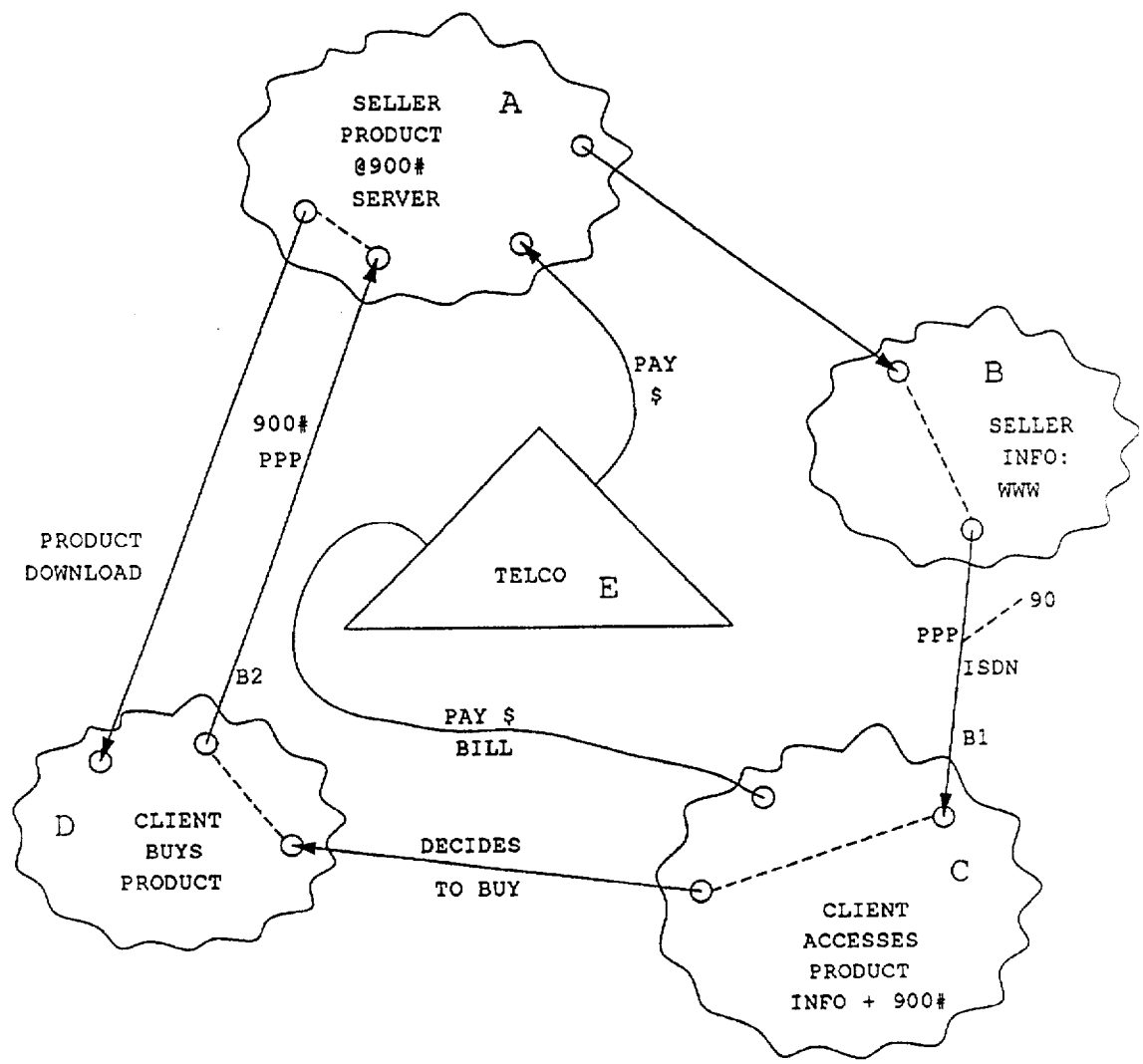
FIG. 6 depicts a state diagram of an ISDN implementation of a preferred embodiment of the present invention.

FIG. 6 depicts a state diagram of the procedure for implementing a preferred embodiment of the present invention wherein ISDN telecommunication lines are utilized. First, a merchant selling software either maintains an internet web server or purchases space on a provider's web server.

In actuality, the merchant employs one server for accessing his/her demonstration software or web page and another server for accessing the software product for sale (assuming the merchant wishes to sell electronic or digital data products). The two servers do not have to be two physical servers if software on one machine can manage two separate servers tied to separate telco connections which is possible by utilizing WinISDN. However, even if two servers, each of these servers can be very low cost systems due to the lack of need for authentication procedures and the like. The merchant then makes available any desired product, possibly including downloadable demonstration software (assumed to have either limited functionality or a limited lifetime or other limiting factor so as to obviously avoid making the entire software product available to all Internet users) on one of the merchant's servers. The merchant then either obtains a 900 number or contracts with a 900 server on which the actual software product is stored, that is, the merchant's second server. The merchant's product(s) is at this point available for sale.

This is better illustrated in FIG. 6 where the state machine begins in state A where the seller or merchant creates his product's server linked to a 900 number. Then in state B, the seller adds a product information or demonstration software on the World Wide Web accessible by Internet users via their web browsers. A potential client places a call to his local router and connects via PPP to TRY router 90. The customer then connects via FTP or web browser or other means to the web site containing the merchant's demo software or information which is shown in state B. The customer then studies or downloads the demo software as appropriate. Upon deciding that he wishes to purchase the product, the customer obtains the 900# specified in the merchant's product information. This is shown in FIG. 6 as state C. Access to the product information begins with a PPP link to the Internet router and an http:\\www.demo.com—type reference to the product information site. A client with ISDN lines will most likely use one of his B channels, lets say channel B1, to access the demo software through the merchant's web page. Upon deciding to purchase the software product(s), the client remains connected on the B channel, in this case B1, and in FIG. 6 the diagram enters state D. In state D the 900 number obtained from the product software information is dialed and a PPP negotiation is used to establish a common communications protocol between the client and the product server. The 900 number connection is made through the client's B2 ISDN link. In other words, the client calls the 900#, negotiates PPP, and downloads the purchased product, or if it's a hardware product, perhaps completes an order form to receive the product later in the mail. The advantage in the latter situation is that the information provided by the user on the order form will be secure and private due to the direct and physical nature of the 900# telecommunications link. Assuming the client wishes to purchase a software product, the client then downloads the software product from seller's product server through the 900 number communications link.

In state E, telco bills the client for the fee associated with the 900 call including any service fees or toll fees. Upon collecting payment from the user, telco subtracts its service or toll fees and forwards the remaining funds to the merchant. Where there are software purchases made by the client, the client may essentially remain anonymous to the seller since the seller has no need to know about the client's identity, credit history, or method of payment. It is important to note that the product server in state A should be implemented using ISDN connectivity with the ability to handle either POTS or ISDN incoming calls on the 900 number. For more details on this implementation see Edwin Klingman's U.S. patent application Ser. No. 08/590,370 filed Jan. 24, 1996 entitled "Universal Input Call Processing System".

In state B, the demo product connectivity is either POTS or ISDN because it is directly connected to the local router. Thus, the client's TRY communication link connects through ISDN's B1 link and the client's BUY communication occurs through B2 of ISDN's communications link. As discussed earlier, B1 connects the client to the demo server through the Internet which uses packet network routing, whereas B2 connects the client to the seller's product server through a physical 900# connection utilizing switching network routing. In this respect, the present invention utilizes multi-network communications links optimally by establishing a (900#) physical connection through the B2 line of ISDN thereby avoiding the requirement to use authentication procedures while ensuring security. When using ISDN, the user need not disconnect from the ISDN B1 connection to engage the ISDN B2 connection. Additionally, due to the fast connection and data transfer times associated with ISDN, data transfer during downloading of either the software product or the demo product will be faster requiring shorter connection time, thus ISDN is the preferred solution.

Description of a POTS Implementation

Figure 7:
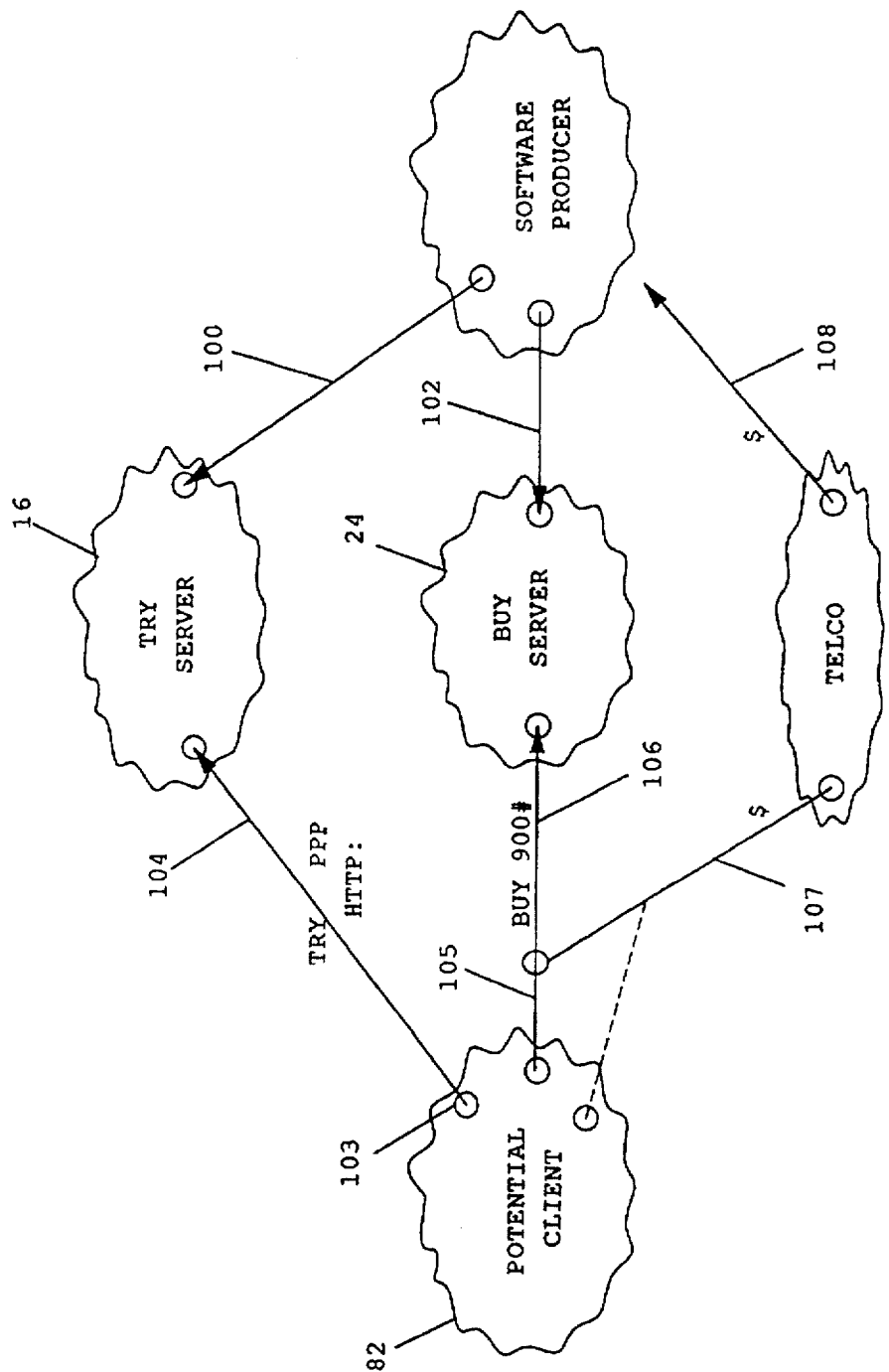
FIG. 7 illustrates a state diagram of an alternative embodiment utilizing POTS lines.

In an alternative embodiment of the present invention, POTS rather than ISDN connection lines may be employed to perform the financial transaction In the state diagram of FIG. 7, the merchant maintains his/her software products on the Internet web server, TRY server 16, or purchases space on a provider web server. The merchant then makes available any desired software product information, possibly including downloadable demonstration software with limited functionality and/or lifetime on his/her web page. The merchant obtains a 900# or contracts with a 900 server for connection to BUY server 24, on which the actual software product is stored. The merchant's web page and/or demonstration software is set up on TRY server The merchant is now ready to begin financial transactions.

Potential client 82 places a call to his local router and connects via PPP to router 104 thereby connecting via FTP or his web browser or other means to TRY server 16 which contains the web site established by the merchant including a 900 number and perhaps software product information and/or a demonstration software. The connection from client 82 to TRY server 16 occurs through the Internet transmission media using, in this case, a POTS line. The client may choose to try the demonstration software prior to purchasing the software product, after all, this is the purpose of the demo product provided by the merchant. To do so, the client downloads the demo product from TRY server 16 to his local machine. Upon deciding that he wishes to purchase the software product, the client obtains the 900 number specified in the merchant's product information, and assuming the client has only one POTS line available, then disconnects from the internet. Obviously, where the client has more than one POTS line available he need not disconnect from the internet and can maintain that connection while placing a call to the 900 number retrieved from TRY server 16. The client's software then negotiates a common protocol via PPP through direct connection 106 to the merchant's BUY server 24.

Where there is software or electronic information for sale, the client can download that information on-line from BUY server 24. If hardware goods are for sale, the client may complete an order form provided by the merchant where any information disclosed by the client on the order form will remain secure and private due to the physical connection established by the 900 call. The merchant may later ship the hardware goods purchased by the client. TRY connection is via POTs line 103 hence to router 104 and then through Internet transmission media to TRY server 16, while BUY connection 106 is through a telephone line directly from the client to the BUY server 24. Accordingly, any information supplied by the client that is of a private nature, such as the client's credit card number, does not go through the Internet and remains secure. Consequently, there is no need for any encryption procedures or digital signatures, although encryption may be used if so desired. As previously explained, the 900 call will be billed to the client and the bill may include service or toll charges plus the price associated with the purchased software. Upon collecting the bill 107, from the client, telco pays the merchant 108, minus any telco maintenance fees.

Implementation of the Cost Variable

A necessary parameter in any financial transaction is the cost. In other words, at some point in time the price of the purchased goods must be known to both sides, that is, the buyer and the seller of the transaction and further agreed upon by both parties. In prior art techniques, cost parameters exist only at the transport layer or above, that is, the buyer and seller exchange and agree upon costs through the Internet. Referring back to FIG. 5, the preferred embodiment of the present invention implements the financial subsystem interface, that is, Financial layer 80 at the Physical layer 78, it is therefore desirable to devise a procedure for passing the cost parameter from application layer 70 through Physical layer 78 obviously without going through the Internet. The Transport layer for the majority of today's Internet machines is implemented using WinSock 1.1, although the latest version, WinSock 2.0 is expected to be available from Microsoft shortly for both Windows 95 and Windows NT. WinSock 2.0 includes a cost parameter that allows applications to identify the cost of the service. This will further facilitate implementation of the cost parameter at the Transport layer as is done by the prior art. However, there still remains the problem of how the present invention implements the cost parameter in light of the Financial layer interfacing at the Physical layer. This necessitates that the money chain stretch from Application layer 70 in FIG. 8 to physical layer 78.

Figure 8:
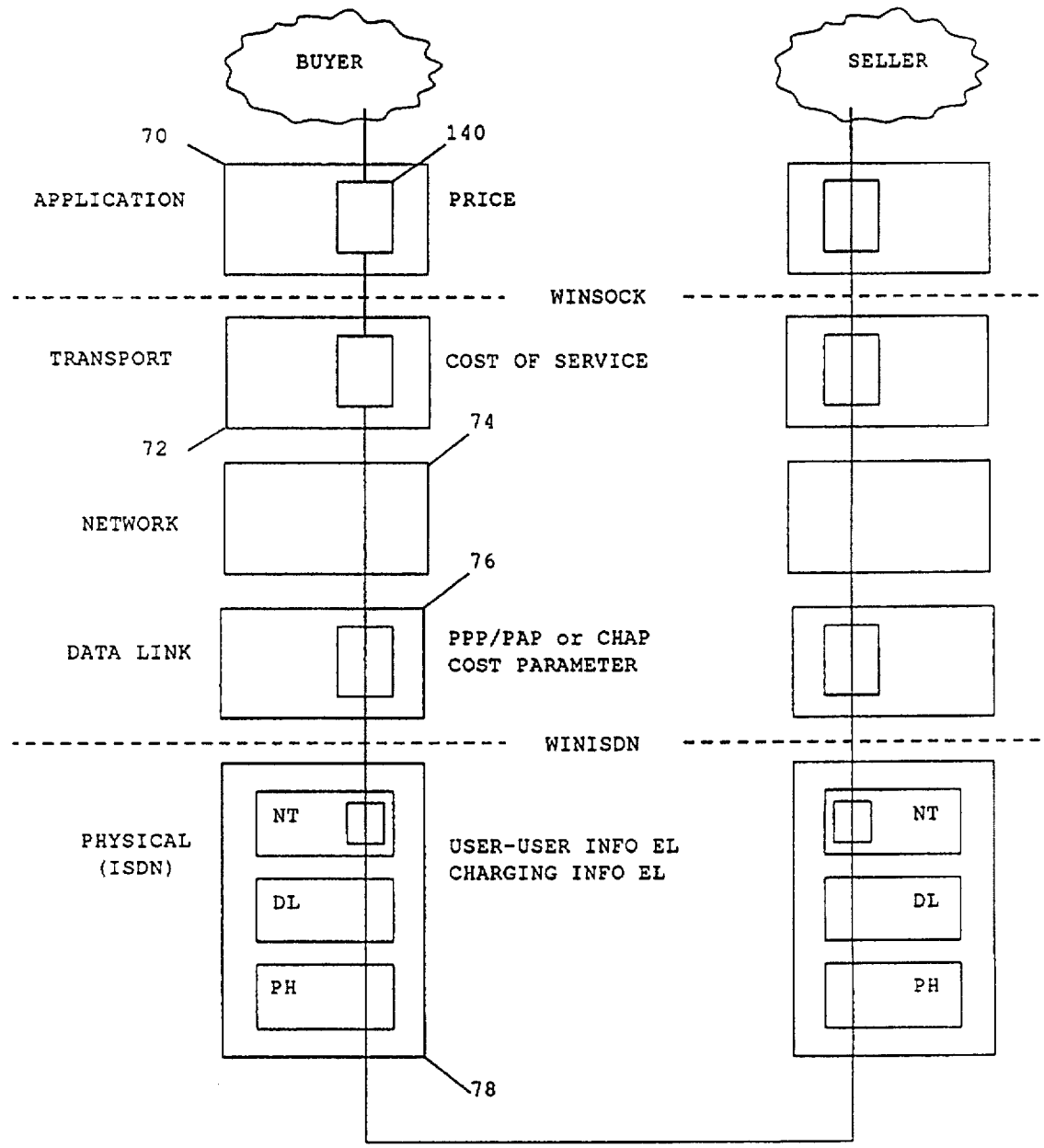
FIG. 8 depicts the present invention's integration of the cost parameter into various network layers.

Here, it is important to understand that the essence of the OSI and TCP IP layered architectures is that each layer only knows about the layer immediately below or above it. Thus, when the financial system is moved from the Application/ Transport layer down to the Physical layer as shown in FIG. 5, it is necessary to find a layer-by-layer path from the Physical to the Application layer. This includes a path for the cost parameter from the Application layer to the Physical layer. Therefore, the layer-by-layer path that the cost parameter must take is from the Transport layer through the Data Link layer to the Physical layer. FIG. 8 depicts the price information or cost parameter 140 passed from Application layer 70 to the Transport layer 72 through the Data Link layer 76 to Physical layer 78. In FIG. 8, one might question why the cost parameter 140 does not go through the Network layer between the Transport layer and the Data Link layer. However, Transport layer 72 (TCP) and Network layer 74 (IP) are usually combined as TCP/IP. That is, Transport layer 72 packets are embedded in Network layer 74 packets. Therefore, in the preferred embodiment, the cost parameter 140 only needs to go through the Transport layer 72 to Data Link layer 76 to Physical layer 78.

A cost parameter 140 at the Data Link layer 76 can be implemented via PAP or a PPP extension through the addition of a cost negotiation procedure similar to PAP. The implementation of the cost parameter at the Data Link layer 76 using PAP will work both on ISDN and POTS system as follows. TRY server 16 includes both the 900 number and the cost of products on the demo page. When the client's web browser downloads this information over the internet in TRY mode, the retrieved information is displayed on the client's terminal, i.e., the 900 number and the cost of the product. In order to purchase the desired product, the client must first present the 900 number to the "dialer" subsystem and also provide the product identification number or other information as the "user name" and the product cost as the "password." The client then clicks on a "connects" button or the equivalent, to place the 900 number call. This procedure will cause the client to dial through to the BUY server 24 which will begin PPP negotiations. It should be noted that after the time when a 900 number is called there is a grace period prior during which connection through the 900# call may be established. It is during this grace period that the BUY server 24 reads the product's identification or other information from the PAP "name" field and the product cost from the PAP "password" field. Then the product ID and password are compared against the merchant's expected cost and product identification. If these match, verification is successful and the buyer and seller have agreed to the price of the merchandise.

Upon unsuccessful verification of either the product ID and/or the password, the 900 call is disconnected and the sale is cancelled before the call is charged to the client. It is important to note that while the use of PAP is being suggested in implementing the cost parameter at the Data Link layer, it is nevertheless not mandatory for PPP to utilize PAP. In fact, PAP's use is also negotiated by PPP. The preferred implementation of the cost variable as suggested above simply automates and tightens the integrity of the financial process more effectively. It is therefore utilized only as a matter of convenience rather than necessity.

The cost parameter 140 of the physical layer 78 in FIG. 8 is supported by WinISDN. ISDN communications links have certain information elements that are designed to convey end-to-end information during call set up. One of these information elements is "User-User" which may be used to convey the cost parameter wherein the merchant's server includes the cost in the User-User information element and thereby provides this information to the client. Although not all ISDN switches currently support User-User information elements, they will soon do so. Systems supported by NTT in the INS-64 service and provided for in EuroISDN and (U.S.) National ISDN include a "charging" information element. This feature may be employed by the preferred embodiment of the present invention utilizing ISDN communication links as follows.

Besides the B1 and B2 ISDN communications links, a third communication link, D channel, having a lower data rate than that of the B1 and B2 channels may be utilized to inform the client of the cost of calling the 900 number via the Q.931 "charging" information element. The difference between passing on the cost parameter through the User-User information elements and the "charging" information element is that the "User-User" information element may be utilized for passing on various types of information and the merchant must program this cost parameter in the "User-User" information element in order to maintain compatibility with the client's communication protocol. On the other hand, the "charging" information element serves the sole purpose of communicating cost information between nodes. However, as discussed above, more ISDN switches support "User-User" information elements than "charging" information elements. Moreover, the typical use of the "charging" information element is to send the final cost at the end of a call, whereas for the intended purposes of the present invention, it is much more desirable to send the costs of the 900 call at the beginning of the call. Therefore, switch software may require modification to send the 900 number cost at the beginning of the call. Perhaps this can be done in the alerting phase of the 900 call.

Credit Management Issues

To the extent credit management problems exist in connection with performing financial transactions offline, virtually those same problems exist when financial transactions are performed online, that is, through telecommunications media. Indeed, most of the efforts applied to the problem of making "Digital Cash" real appear to be designed from the perspective of large businesses. For example, Inter@ctive Week, Apr. 22, 1996, in a discussion of online sales of software, describes Microsoft's selling procedure. As is well known, Microsoft deals with the largest distribution chains, but, "on the Net, Microsoft sells just to CyberSource, which sells to end users." However, Microsoft would "rather write software than manage credit to electronic resellers." Furthermore, "CyberSource doesn't want to manage credit either."

Thus, it would appear that the management of credit is a major problem underlying the electronic sale of software. While this is the problem that is addressed in so many ways by the various E-commerce ventures, the problem for online software sales is herein easily solved. Today the lion's share of computers, even mobile computers, are connected in some way to a specific base of operations associated with a Directory Number, DN. Thus, inherently, the creditworthiness of the buyer is associated with the continued ability to pay for phone service, and therefore a large percentage of the credit risk is qualified. When the phone company (telco) bills and collects, the seller is backed up by the clout (mass) of the telco, while the buyer must meet telco credit history requirements. By interfacing the Financial layer to the Physical layer as taught by the present invention, the increased aggravation of credit problems associated with interfacing to the Transport layer (as the prior art) is eliminated.

Software Implementation of BUY Operation

The BUY operation may be implemented automatically by software with little or no client interaction. The client having tried the merchant's product by perhaps downloading and utilizing the merchant's demo software and ultimately deciding to buy the product, may convey his/her decision by checking a "BUY-button." Because the extraordinary growth of the Internet is based on the World Wide Web, the preferred implementation will work with HTML. This can be done in one of two ways. One way is to create a new web browser, and another way is to modify an available browser. The HTML basis of the web pages is simple as shown below.
<HTML>
<HEAD>
<TITLE> The Product name or other title
</HEAD>
<BODY>
<H1> This is a heading
<P> This is a new paragraph
</BODY>
</HTML>

A client web browser after connecting to the web site via TCP/IP downloads the web page and interprets the text. The browser formats the display text on the user's screen according to the language elements. New elements are defined and inserted into the HTML text strings such as:
<#900 Dial="1-900-555-1234">
<$Cost Cost="$7.95">

The two elements above are obviously the 900# and costs associated with the desired product. It should be apparent to one of ordinary skill in the art to parse the expressions above and to retrieve the cost and the 900#. This can be done by calling the appropriate subroutines, or alternatively, using variables for indirect addresses in substantially the same way as the HTML "href" command for defining the location of a price in the price table or the subaddress of the 900#. One may develop a detailed and custom software implementation. However, perhaps modifying the most popular web browser is the simplest and most cost-effective alternative for implementing the preferred embodiment in the software. To this end, it is much easier to achieve market penetration by extending popular software, such as current web browsers, rather than introducing entirely new software to the market. At this time, the Netscape Navigator (2.0 or 3.0) is the most widely used web browser. Accordingly, extending the functionality of Netscape Navigator to implement the requirements of the present invention will be shown.

The extension of the web browser is via a mechanism known as a "plug-in" and the tools and documentation necessary to develop "plug-ins" can be found on the web at:

http://home.netscape.com/oemprod/development_partners/plugin_api/index.html

Although plug-ins can be developed for Apple Macintosh computers, only the Microsoft Windows version of plug-ins will be considered for brevity. Plug-ins allow the developer to create a window within the navigator environments and use the window to display information, execute an application, support application-to-application communications or provide links to other web sites. Plug-ins are invoked when HTML page is downloaded to the client's subsystem which includes the specific data objects that the plug-in is written to handle. Plug-ins are embedded in HTML via the "EMBED" tag. A plug-in is a dynamic code module and unlike JAVA modules which are platform independent, plug-ins are platform dependent. When using the Window's platform, the following resources should be made available to the plug-in developer:

| | | |
|---|---|---|
| Netscape.exec | -the web browser | (Netscape) |
| Winsock.dll | -the transport data link layer | (Netmanage) |
| WinISDN.dll | -the physical layer | (ISDN*tek) |
| Windows OS | -the operating system | (Microsoft) |
| PC*TE | -terminal adaptor hardware | (ISDN*tek) |
| Visual C++ | -standard development tool | (Microsoft) |

A fundamental use of a (Netscape) plug-in is to fetch a URL with the same functionality as the Netscape client software. The plug-in can use the Netscape API functions and can also use the Windows API, WinSockAPI, WinISDN API, Video or Windows, etc. The code for the plug-in is developed using Visual C++ and a DLL is created that will be loaded at the appropriate time. The plug-in is embedded in the HTML page using the EMBED tag:

<EMBED src width height>.

Figure 9:
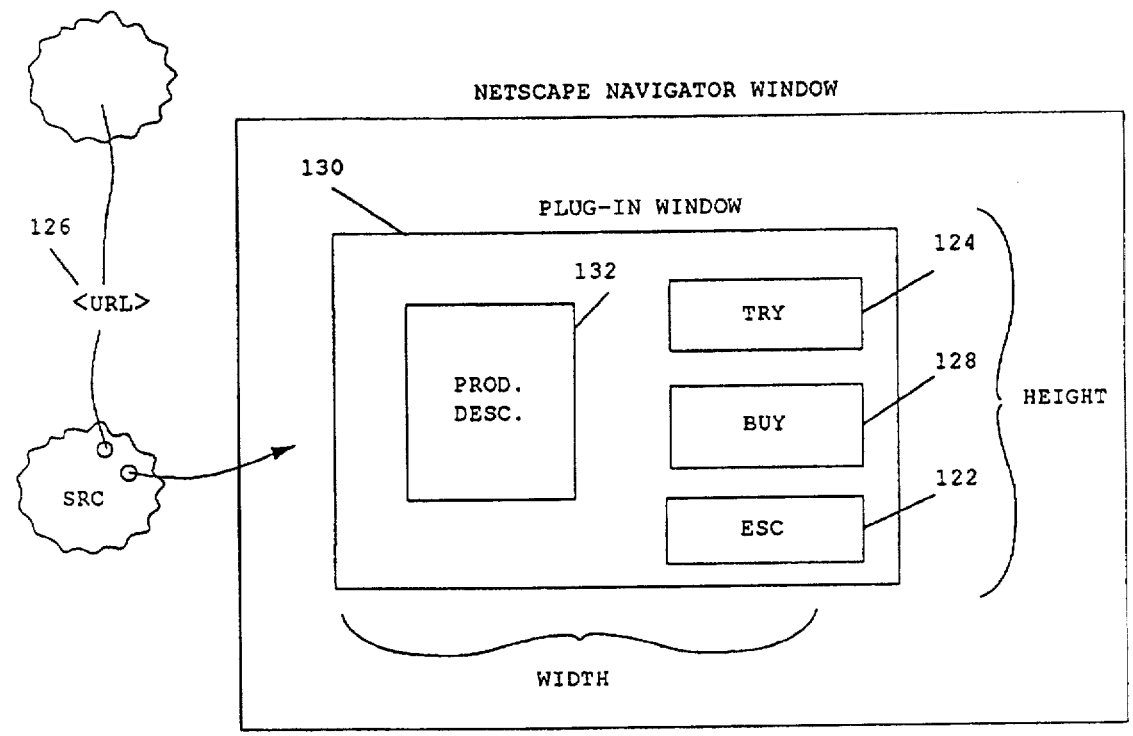
FIG. 9 shows a Netscape Navigator window employed in a preferred embodiment of the present invention.

The "src" parameter links the browser to the plug-in code while width and height specify the size of the plug-in window. The plug-in API provides a native window handler to the plug-in. An example software for embedding plug-in in the HTML page is described in the Netscape Navigator Plug-in Software Development Kit. Given a native window handler, it should be apparent to one of ordinary skill in the art that text fields, buttons, lists and other Window elements can be implemented in the client window, and that the window handler is sufficient for event processing, that is, button clicks, etc. Standard Window event processing allows the plug-in to respond to mouse clicks in the plug-in window. In FIG. 9, assume the user clicks on the ESC button 122. This button should close the Netscape Navigator window 120, cancel the operations, and return to the Netscape Navigator. Assume the user clicks on the TRY button 124. The action to be taken will depend upon the form of the product information or demonstration. In the simplest case, a URL 126 allows the Netscape Navigator to retrieve and display the product information. Alternatively, a JAVA applet may be downloaded and executed, or an application-to-application procedure may be executed by the plug-in "TRY" process. Thus, the possible responses to selections of the TRY button 124 range from displaying of product information to sophisticated interaction with the clients.

Assume the user clicks on the BUY button 128. This action should either result in the downloading of the purchased information or in the presentation of an order form for hard goods that require shipping. The presentation of an order form via CGI, JAVA script, plug-in code, etc., is apparent to one of ordinary skill in the art. When the user clicks on the BUY button 128 the plug-in event handler must retrieve the 900# and the costs associated with the product from the HTML page. These parameters may be simple HTML text that is read and recognized by the plug-in procedure. An alternative method takes advantage of the optional attributes associated with the EMBED tag. The plug-in developer can invent attributes that will be processed by the plug-in as appropriate. For example, a plug-in may use the following:

<EMBED SRC="product.buy" WIDTH=320 HEIGHT=200 DIAL="1-900-555-1234" COST="$7.95">

Figure 10:
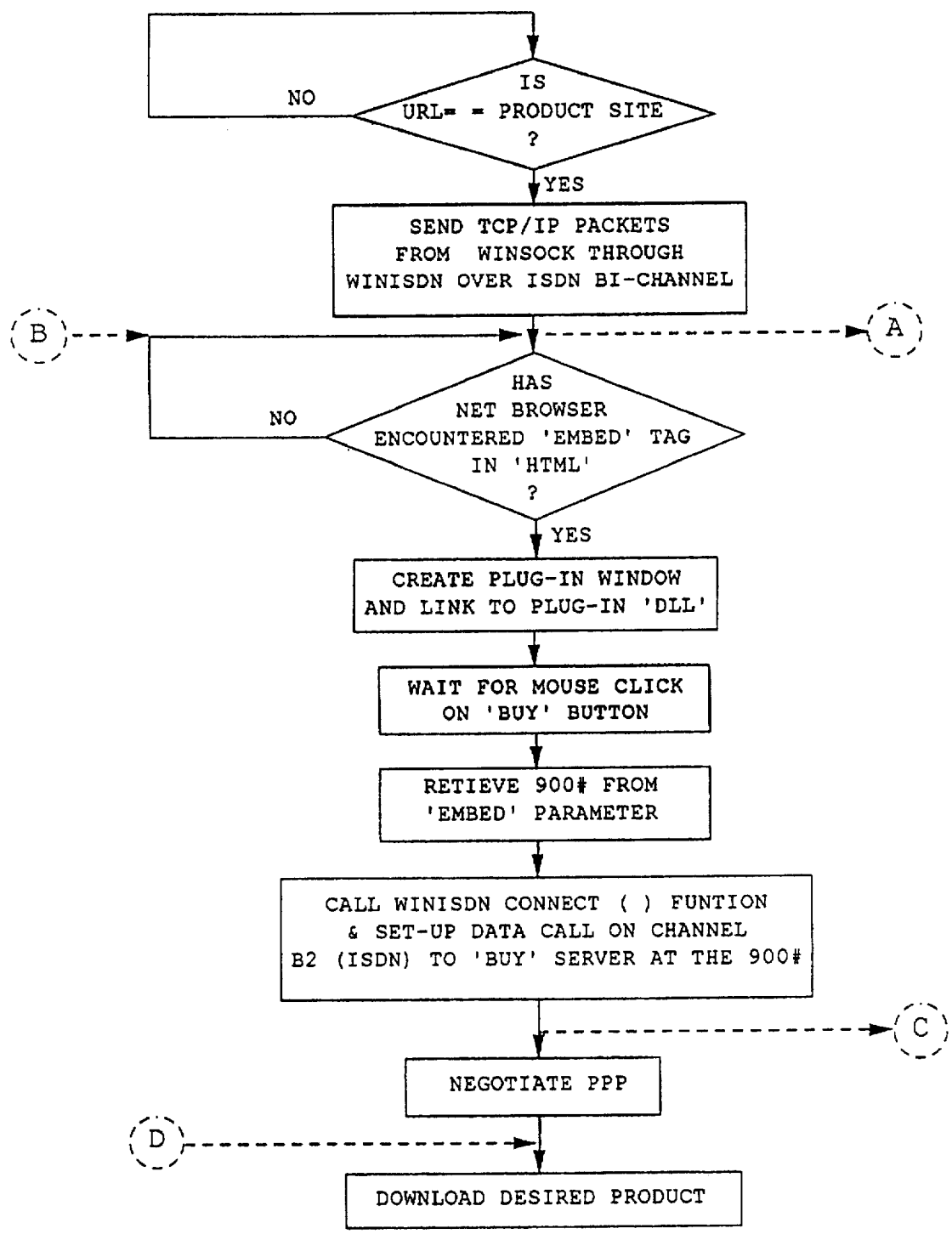
FIG. 10 is a flow chart of a software execution as implemented by the client's subsystem.
Figure 11:
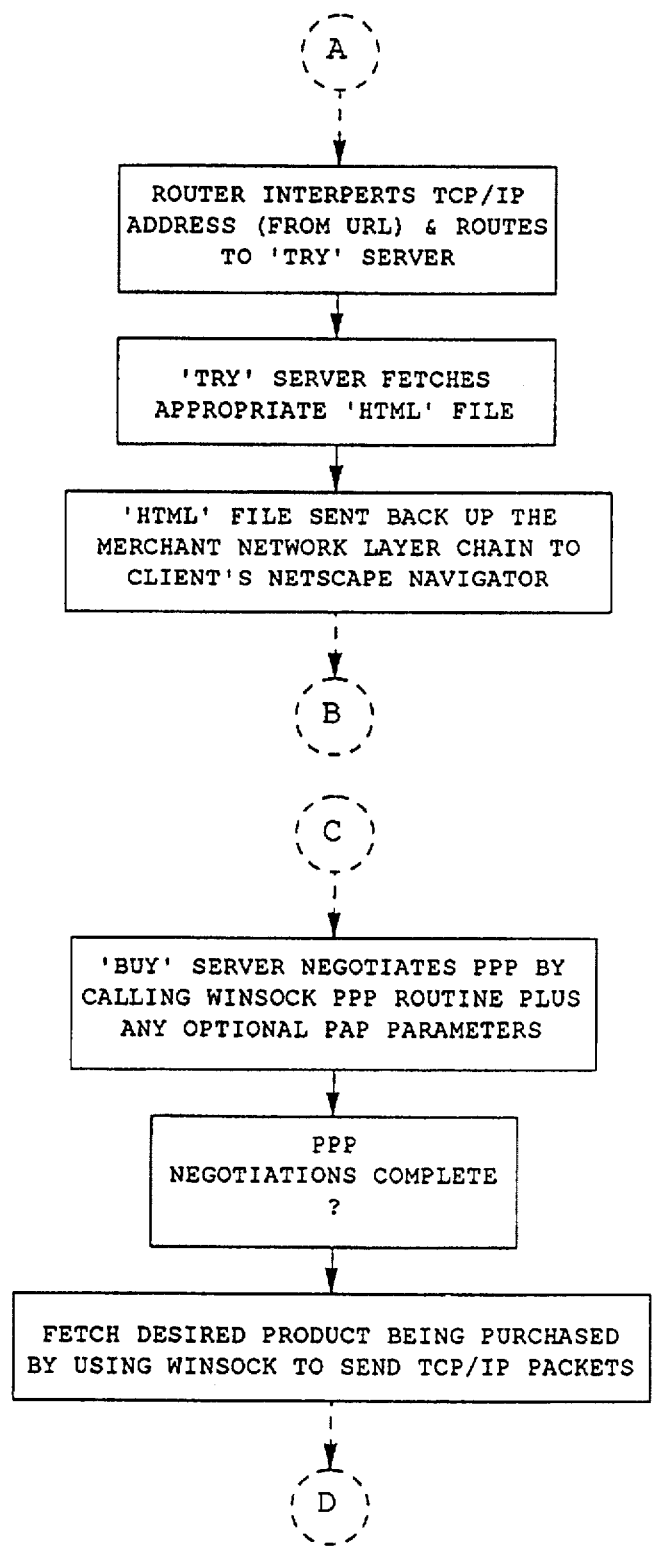
FIG. 11 is a flow chart of the steps implemented by the merchant's system and router in response to the client's subsystem in FIG. 10.

The plug-in can read the invented DIAL and COST parameters and use these as appropriate. Referring to FIG. 9, clicking on the BUY button 128 will cause the plug-in to retrieve the cost and the 900# and issue an ISDN CONNECT() function-call to WinISDN thereby initiating a call to the BUY server from which the product is to be downloaded. WinISDN will notify the plug-in when the CONNECTION event is successful. The plug-in will then call the PPP negotiation procedure optionally passing the cost parameter (and other parameters) for the PAP negotiation. Upon successful completion of the PPP negotiations, the plug-in can call WinSock to perform UDP or TCP downloading of the purchased product. Upon completion of downloading the purchased product, the plug-in can terminate or optionally launch a new product. A more detailed description of this procedure is depicted in FIGS. 10 and 11. Assume TRY and BUY servers exist in "listen" mode. Additionally, assume the Netscape browser exists with the appropriate plug-in on the client's or buyer's machine and that the client is already connected to the internet on ISDN channel B1.

The software residing on the client's subsystem automates the system by facilitating the TRY and BUY operations with little human interaction. The steps the software performs are shown in FIG. 10. When URL is the same as the product site or product directory catalog site, the TCP/IP packets are sent from WinSock through WinISDN over ISDN channel B1. In FIG. 11, the router then interprets the TCP/IP address from URL and routes the same to the merchant's TRY server. On the merchant's side, the TRY server then fetches the appropriate HTML file which is sent back up through the merchant network layer chain to the client's Netscape Navigator. The client can accordingly browse the seller's web page and select to either TRY or BUY the product. Referring back to FIG. 10, the client's net browser encounters the EMBED tag in the HTML file. The client's Netscape browser then creates a plug-in window and links to plug-in DLL. The latter responds to the client's mouse click on the BUY button, assuming the client has decided to purchase the product. In the event the client chooses to TRY the demo version of the product, the demo is downloaded to the client's system and the client may leave the web page and Internet, in which case the B1 channel connection will be terminated By the software. This can be done in cases where the client wishes to spend significant time TRYing the demo product prior to purchasing the product. If the client wishes to purchase the product, he/she can go back to the seller's web page and press the BUY button, in which case the software will retrieve an associated 900#.

By retrieving the 900# from EMBED parameter or otherwise in calling WinISDN CONNECT() function to set up a data call on channel B2 to the merchant BUY server at the 900#. In FIG. 11, the BUY server then negotiates PPP with the plug-in routine that calls the WinSock PPP routine with optional PAP parameters. Upon completion of PPP negotiations. WinSock can be used to send TCP/IP packets which ultimately fetch the product being purchased from the BUY server. In FIG. 10, the client's subsystem downloads the desired product and either executes the same or stores it in his machine. It should be noted that the procedure as described above uses open standards (Winsock, WinISDN, PPP, TCP/IP, Q.931, plug-in API HTML) and commercially available software (Netscape Navigator, Net Manage Winsock, iSDN*tek WinISDN) and hardware such as the IBM PC clone, and ISDN*tek PC*TE terminal adaptor. The plug-in is built with the popular commercial Visual C++ tools from Microsoft. Many enhancements and variations on the above theme are possible while maintaining the spirit of the invention.

Figure 12:
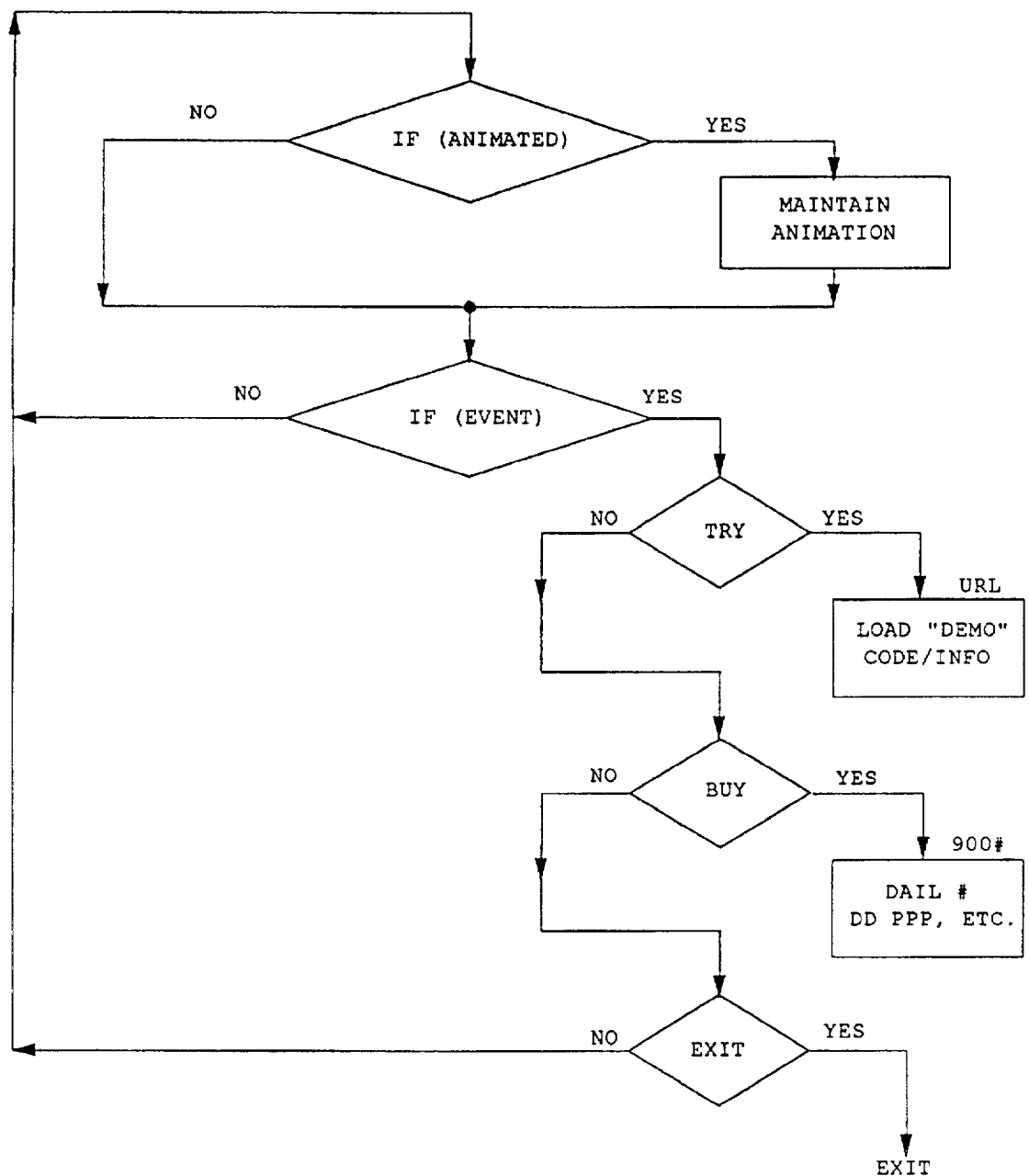
FIG. 12 depicts a flow chart of the events likely to take place as a result of the client's input to the Netscape Navigator window settings of FIG. 9.

Referring now to FIG. 9, the plug-in window 130 should display the product description 132. Additionally, if animated, the system should maintain the action, and when the user or buyer selects via a key or a mouse click or other ways a button, the system should then take appropriate action. The product description 132 may be an animated cartoon, a film clip, an audio clip, etc. In essence, the screen depicted in FIG. 9 is shown to the client while awaiting events depicted on FIG. 12. In FIG. 12, if the system is animated, it will maintain the animation while awaiting an event triggered by a client's keystroke or click of the button. In the event the system is not animated, the system still awaits an event to occur by the client. Where the client presses a button and an event is triggered, the system takes appropriate action. For example, if the client wishes to try the desired software product, the system loads the demo version onto the client's system. Where the client desires to purchase the desired product, the system retrieves the 900# and dials the same. It then negotiates ppp and downloads the desired product to the client's system.

Referring to FIG. 10, where the client's system employs POTS lines rather than ISDN terminals and there is only one POTS line available to the client, after the step of retrieving the 900# from the EMBED parameters and prior to when the 900 call is placed, the client's subsystem would first disconnect the POTS line used for the TRY operation and thereafter establish the 900 call through the same line.

Discussion of JAVA End-to-End Protocol

Once PPP-TCP/IP access is established (via a 900 number telephone toll) the question arises as to the preferred control protocol. Today the most platform independent language designed for Internet applications is Sun Microsystems JAVA (TM) language as represented using JAVA byte codes for a virtual JAVA machine. While in general, cross platform tools typically yield uneven results across different user interfaces requiring that applications be recompiled for different platforms, JAVA virtual machines or interpreters were designed to be machine independent. This will allow a single program to run unchanged on the range of platforms. The present invention is designed to support JAVA byte codes on either the BUY operation or the TRY operation, or both. How can the remote system adapt to PPP protocol negotiation and/or JAVA byte codes, etc.? The Edwin Klingman U.S. patent application Ser. No. 08/590,370 filed Jan. 24, 1996 entitled "Universal Input Call Processing System" describes how a remote control system based on the Cyberspace Enterprise card can detect what type of local control or access is being attempted. This will support 900 telephone toll numbers to controllers, etc.

Although the present invention has been described in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A method of establishing on-line secure financial transactions for purchasing goods through electronic media, said method comprising:

providing a local subsystem disposed at a local location accessible to a user and responsive to a user input;

providing a remote subsystem located at a remote location, said remote location having at least one identifiable product remotely selectable by the user;

establishing a first communication link between the local subsystem and the remote subsystem;

selecting at least one of said identifiable products through the first communication link;

retrieving through the first communication link a telephone toll number from a predetermined numbering system associated with the selected product;

using said retrieved telephone number to establish a telephone toll connection through a second communication link between the local subsystem and the remote subsystem; and downloading the selected product through the second communication link from the remote subsystem to the local subsystem, whereby during said downloading of the product a fee is assessed and charged at a rate determined by the toll connection provider.

2. A method as recited in claim 1, wherein the predetermined numbering system is a 900 numbering system.

3. A method as recited in claim 2, wherein said toll connection provider performs the accounting functions, billing functions, funds collection and distribution necessary for the conductance of legal business.

4. A method as recited in claim 3, wherein said second communication link is a direct link.

5. A method as recited in claim 4, wherein said first communication link is selected from the group consisting of POTS and ISDN, and second communication link is selected from the group consisting of POTS and ISDN.

6. A method as recited in claim 5, wherein upon selection of POTS, said first communication link is terminated prior to said step of establishing the second communication link and after said step of retrieving said toll number.

7. A method as recited in claim 6 and further comprising:

prior to said downloading step, retrieving through said first communication link product information and cost associated with the selected product;

transmitting said product information and cost via said second communication link to said remote subsystem; and verifying the transmitted product information and cost to determine that the toll connection corresponding to the selected product has been established.

8. A method as recited in claim 7 and further comprising, after said step of transmitting said product information and cost and upon unsuccessful verification of the retrieved product information or cost, terminating said second communication link.

9. A method as recited in claim 1 wherein a third party performs the accounting functions, billing functions, funds collection and distribution necessary for the conductance of legal business.

10. A method as recited in claim 1 wherein said first communication link is selected from the group consisting of POTS and ISDN and said second communication link is selected from the group consisting of POTS and ISDN.

11. A method as recited in claim 1 and further comprising, upon selection of POTS and prior to said step of establishing the second communication link and after said step of selecting the product, terminating said first communication link.

12. A method as recited in claim 1, and further comprising:
   prior to said downloading step, retrieving through said first communication link, product information or cost associated with the selected product;
   transmitting said product information or cost via said second communication link to said remote subsystem; and
   verifying the transmitted product information or cost to determine that the toll connection corresponding to the selected products has been established.

13. A method as recited in claim 12, wherein after said step of transmitting said product information or cost and upon unsuccessful verification of the product information or cost, terminating said second communication link.

14. A remote communication system for securing electronic purchases of digital information on-line comprising:
   a local subsystem disposed at a local location and accessible to a user, said local subsystem being responsive to a user input and operative to generate communicative data corresponding thereto;
   means establishing a first communication link for communicating said communicative data to a remote location;
   a remote subsystem located at said remote location for receiving said communicative data and in response thereto transmitting a telephone toll number, product information or product cost associated with a product selected by the user back through said first communication link to said local subsystem;
   means using the transmitted toll number to establish a second communication link between said local subsystem and said remote subsystem through which said selected product may be ordered;
   said remote subsystem including
      means for determining that the product ordered via said second communication link corresponds to said toll number; and
      means for transferring the ordered product from said remote subsystem to said local subsystem through said second communication link.

15. A remote communication system as recited in claim 14 wherein the telephone toll number is from a 900 numbering system.

16. A remote communication system as recited in claim 15 wherein a third party performs the accounting functions, billing functions, funds collection and distribution necessary for the conductance of legal business.

17. A remote communication system as recited in claim 16 wherein said first communication link is selected from the group consisting of POTS and ISDN, and said second communication link is selected from the group consisting of POTS and ISDN.

18. A remote communication system as recited in claim 17 further including:
   means for retrieving through said first communication link, product information or cost associated with the selected product;
   means for transmitting said product information or cost via said second communication link to said remote subsystem; and
   means for verifying said transmitted product information or cost to determine that the toll connection corresponding to the selected product has been established.

19. A remote communication system as recited in claim 18 further including means for terminating said second communication link upon unsuccessful verification of the retrieved product information or cost.

20. A remote communication system for securing electronic purchases of digital information on-line comprising:
   a local subsystem disposed at a local location accessible to a user and responsive to a user input;
   a remote subsystem located at a remote location, said remote subsystem having at least one identifiable product remotely selectable by the user;
   means establishing a first communication link between the local subsystem and the remote subsystem through the Internet transmission media for selecting at least one of said identifiable products;
   means for transmitting a telephone toll number associated with the selected product from said remote subsystem to said local subsystem;
   means for retrieving said toll number through said first communication link;
   means establishing a second communication link between the local subsystem and the remote subsystem through a telephone toll connection using said retrieved toll number;
   means for downloading the selected product through said second communication link from the remote subsystem to the local subsystem, whereby a fee is assessed and charged for said downloading means based upon a rate determined by the toll connection provider.

21. A remote communication system as recited in claim 20 wherein said telephone toll number is selected from a 900 numbering system.

22. A remote communication system as recited in claim 21 wherein said first communication link is selected from the group consisting of POTS and ISDN, and said second communication link is selected from the group consisting of POTS and ISDN.

* * * * *